United States Patent [19]

Moffatt et al.

[11] Patent Number: 5,891,232

[45] Date of Patent: Apr. 6, 1999

[54] SMEARFASTNESS AND FAST DRYING TIMES IN INKS CONTAINING MACROMOLECULAR CHROMOPHORES

[75] Inventors: John R. Moffatt; Joseph W. Tsang, both of Corvallis, Oreg.

[73] Assignee: Hewlett-Packard Company, Palo Alto, Calif.

[21] Appl. No.: 958,948

[22] Filed: Oct. 28, 1997

[51] Int. Cl.$^6$ ...................................................... B09D 1/00
[52] U.S. Cl. .................................. 106/31.89; 106/31.58; 106/31.15
[58] Field of Search ........................... 106/31.58, 31.89, 106/31.15

[56] References Cited

U.S. PATENT DOCUMENTS

| | | | |
|---|---|---|---|
| 5,085,698 | 2/1992 | Ma et al. | 106/20 |
| 5,182,425 | 1/1993 | Matrick et al. | 106/22 R |
| 5,302,197 | 4/1994 | Wickramanayake | 106/22 Y |
| 5,531,816 | 7/1996 | Wickramanayake | 106/20 R |
| 5,565,022 | 10/1996 | Wickramanayake | 106/31.58 |
| 5,749,952 | 5/1998 | Tsang et al. | 106/31.89 |
| 5,750,594 | 5/1998 | Page et al. | 523/161 |
| 5,760,124 | 6/1998 | Listigovers et al. | 106/31.13 |
| 5,785,745 | 7/1998 | Lauw et al. | 106/31.58 |
| 5,788,753 | 8/1998 | Pawlowski et al. | 106/31.43 |

*Primary Examiner*—Mark L. Bell
*Assistant Examiner*—Veronica F. Faison

[57] ABSTRACT

A smearfast, waterfast, and fast drying ink is provided, employing macromolecular chromophores (MMCs) and both ionic surfactants and zwitterionic, or amphoteric, surfactants, in which the ionic surfactant is of the opposite polarity of the MMC. Macromolecular chromophores are pigments whose surface has been treated to provide either anionic or cationic functional groups thereon. The zwitterionic surfactant gives rise to waterfastness, while the ionic surfactant gives rise to both smearfastness and fast drying.

18 Claims, No Drawings

SMEARFASTNESS AND FAST DRYING TIMES IN INKS CONTAINING MACROMOLECULAR CHROMOPHORES

TECHNICAL FIELD

The present invention relates generally to ink-jet inks, and, more particularly, to ink-jet inks which employ surface-treated pigments as the colorant.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum connects to a reservoir for storing the ink. A plurality of such resistor elements forms a pattern in a printhead. This pattern is called a primitive. Each of the resistor elements line up with a nozzle in a nozzle plate, through which ink is expelled toward a print medium. The entire assembly of printhead and reservoir comprises an ink-jet pen.

In operation, each resistor element connects through a conductive trace to a microprocessor, where current-carrying signals cause one or more selected elements to heat. The heating creates a bubble of ink in the chamber, which is expelled through the nozzle toward the print medium. Firing a plurality of such resistor elements, in a particular order, in a given primitive, forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles (typically 50 mm diameter) require that the ink not clog the nozzles. Furthermore, repeated firings of the resistor elements, which must withstand about 10 million firings over the life of the ink cartridge, can result in fouling of the resistor element. Kogation is the term used for this type of fouling. The ink composition must be capable of interacting with the print medium, especially paper, to penetrate it without undue spreading. Finally, the ink composition should be smear and water resistant on the paper.

Many inks possess one or more of the foregoing properties. However, few ink compositions posses all of those properties, since an improvement in one property often results in the degradation of another. Thus, inks used commercially represent a compromise in an attempt to achieve an ink evidencing at least an adequate performance in each of the aforementioned properties.

Accordingly, investigations continue into developing ink formulations that have improved properties such as reduced kogation and reduced crusting (i.e. improved decap). Further properties sought to be improved include high edge acuity, high optical density, fast drying times, good waterfastness, and good smearfastness, all without sacrificing performance in other necessary properties.

Recent advances in ink-jet inks have incorporated pigments in place of the earlier water-miscible dyes. However, pigments by definition are not water-miscible, and require the presence of a dispersing agent. Further investigations into the use of pigments have determined that surface treatment of the pigment, to form either anionic or cationic functional groups on the surface, provides a macromolecular chromophore (MMC) that is water-soluble, thus eliminating the requirement for a dispersing agent.

Investigation continues into the use of pigments that have been treated to be water-miscible, but which possess most, if not all, of the foregoing desired properties.

DISCLOSURE OF INVENTION

In accordance with the present invention, a smearfast and fast drying ink is provided, employing MMCs and both ionic surfactants and zwitterionic surfactants. The smearfastness is obtained by employing an ionic surfactant having a charge opposite to that of the MMC. The ionic surfactant also provides the ink with waterfastness. The fast drying is obtained by incorporating the zwitterionic, or amphoteric, surfactant, such as an amine oxide, in the ink. The ink of the present invention comprises:

(a) a vehicle comprising (1) 0 to about 30 wt % of at least one organic solvent, and (2) about 1 to 10 wt % of at least one water-soluble ionic surfactant having a first polarity, and (3) about 0.01 to 20 wt % of at least one zwitterionic surfactant;

(b) about 1 to 20 wt % of at least one chemically-modified, water-soluble macromolecular chromophore comprising a pigment having functional groups of a second polarity opposite to the first polarity associated therewith; and (c) the balance water.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

All concentrations herein are expressed in weight percentages, unless otherwise indicated. The purity of all components is that employed in normal commercial practice for ink-jet inks.

In accordance with the present invention, an ionic surfactant of one charge is employed with a macromolecular chromophore (MMC) of the opposite charge. That is, a cationic surfactant is employed in conjunction with an anionic MMC, while an anionic surfactant is employed with a cationic MMC.

As indicated above, the term "macromolecular chromophore" refers to a pigment whose surface has been treated to provide functional groups thereon. An anionic MMC is one comprising a pigment that has been at least partially functionalized with sulfonate or carboxylate groups, while a cationic MMC is one comprising a pigment that has been at least partially functionalized with ammonium groups. The water-soluble macromolecular chromophores (MMCs) are commercially available from colorant vendors such as Cabot Corp. and Orient Chemical.

The cationic surfactants comprise quaternary ammonium salts having the formula given by

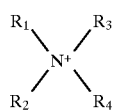

where $R_1$, $R_2$, $R_3$, and $R_4$ are alkyls represented by the formulae $R_1 = -(CH_2)_n CH_3$ $R_2 = -(CH_2)_m CH_3$ $R_3 = -(CH_2)_l CH_3$ $R_4 = -(CH_2)_k CH_3,$ where k, l, m, and n are integers independently within the range of 0 to 25. Additionally, phosphonium surfactants may be used as cationic surfactants. Such phosphonium surfactants are represented by the formula

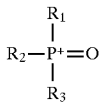

where $R_1$, $R_2$, and $R_3$ are as defined above.

Counterions to the ammonium ion (quaternary) species include, but are not limited to, halides, sulfate, nitrate, phosphate, sulfonate, tetrafluororborate, methanesulfonate, phosphite, phosphonate, methyl benzenesulfonate, hexafluorophosphonate, hexafluorophosphate, phosphene, phenolate, tungstate, molybdate, and silicate ions.

The anionic surfactants comprise sulfonates and carboxylates selected from the group consisting of

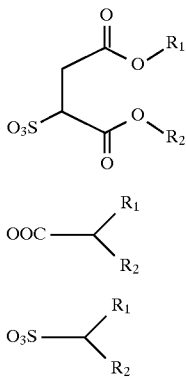

where $R_1$ and $R_2$ are alkyls represented by the formulae $R_1 = -(CH_2)_n CH_3$ $R_2 = -(CH_2)_m CH_3$ where m and n are integers independently within the range of 10 to 25.

Counterions to the anions above include, but are not limited to, all the ammonium ions derived above, such as dimethylammonium, trimethylammonium, dipropylammonium, and tetramethylammonium ions.

Additional surfactants include bolaform-containing surfactants (surfactants containing two cationic sites):

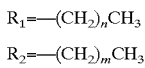

where p is an integer within the range of 6 to 25.

The concentration of the ionic surfactant(s) in the ink ranges from about 0.1 to 10 wt %, and preferably from about 0.2 to 5 wt %.

The ink formulation of the present invention further includes zwitterionic surfactants, such as amine oxides having the formula $R-N^+(CH_3)_2 O^-,$ where R is either a saturated or an unsaturated alkyl group having a chain length between 8 and 25 carbon atoms.

The zwitterionic surfactants are present within the concentration range of about 0.01 to 20 wt %, and preferably within the range of about 0.2 to 1 wt %.

Examples of amine oxides suitably employed in the practice of the present invention include N,N-dimethyl-N-(Z-9-octadecenyl)-N-amine oxide (OOAO), N,N-dimethyl-N-dodecyl amine oxide (NDAO), isostearamidopropylamine oxide; isostearamidopropyl morpholine oxide; lauramine oxide; myristamine oxide; cetamine oxide; minkamidopropylamine oxide; oleamidopropylamine oxide; oleyl dimethylamine oxide; olivamidopropylamine oxide; stearamine oxide; sesamidopropylamine oxide; and wheat germamidopropylamine oxide.

Other zwitterionic surfactants that may be employed in the practice of the present invention include the betaines, which have the formula

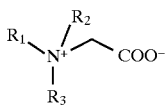

where $R_1$, $R_2$, and $R_3$ are each in the range of 10 to 23 carbon atoms. $R_1$, $R_2$, and $R_3$ are independently selected from the group consisting of alkyls, alkenyls, alkynes, aryls, and arenes.

In formulating the ink-jet inks of the present invention, one or more co-solvents may be employed in the vehicle. These co-solvents are substantially water-miscible. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,$\omega$-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols. The co-solvent concentration may range from 0 to about 30 wt %, with about 3 to 15 wt % being preferred.

The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch®

900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

For anionic chromophores, the counterions include all alkali metal ions and alkaline earth metal ions, as well as both substituted and unsubstituted ammonium ions. For cationic chromophores, suitable counterions include all halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

It is recognized that there may be adverse interactions, such as precipitation, between counterions for the ionic surfactant and counterions for the MMC. However, one skilled in this art is considered to have the requisite knowledge that will enable that person to formulate inks by appropriate selection of counterions that would not exhibit such undesirable adverse interactions.

The concentration of the MMC is within the range of about 0.1 to 20 wt % and, preferably, within the range of about 0.5 to 10 wt %.

A preferred pigment is a functionalized graphite-like (carbon black) particle with mean diameter ranging from about 0.005 to 12 $\mu$m. Colorants of this type result from chemical reactions where solvent-accessible functional groups are derivatized to provide solubilizing groups that render the colorant soluble in water. This resulting macromolecular chromophore (MMC) is water-soluble, with its solubility being similar to that of well known and commercially used water-soluble acidic and basic dyes. Such MMCs are available, e.g., from Cabot Corp. and Orient Chemical, as indicated above.

A typical formulation for an ink useful in the practice of the present invention includes at least one zwitterionic surfactant, such as an amine oxide (about 0.2 to 1 wt %), at least one water-soluble ionic surfactant (about 0.2 to 5 wt %), at least one solvent and/or at least one co-solvent (about 3 to 15 wt %), a macromolecular chromophore (about 0.5 to 10 wt %), and water.

In the fabrication of the ink, the above-mentioned ingredients are combined and stirred mechanically or mixed using low power sonication.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The smearfastness of the inks of the present invention apparently arises from a combination of Coulombic and specific interactions for the hydrophobe (the hydrocarbon twin tails of the ionic surfactant). Initially, the MMC attracts the hydrophobic anion by long-range Coulombic forces. (An anionic MMC also attracts a cationic surfactant by long-range Coulombic forces.) This attraction is rapid and occurs upon mixing. After a short induction time, the twin-tail surfactant species arranges its hydrophobic moiety such that short range (van der Waal's or specific forces) can occur. A charged MMC has its effective charge reduced on some selective ions on the MMC surface and thus becomes zwitterionic in those regions, a net zero charge. With its Coulombic repulsion reduced, the approach of other MMCs occur more frequently and the overall stability in the absence of aqueous solution is reduced. When printed on a media surface, the attraction of dipoles and ion-dipole interactions will increase and some crosslinking with MMC patches among reduced charge will inevitably occur. This can account for the smearfastness.

The zwitterionic surfactant apparently gives rise to the waterfastness. The twin-tailed cationic surfactant gives rise to the smearfastness and the rapid drying.

EXAMPLES

In searching for smearfast, fast drying, black inks, the present inventors found that the following compositions gave exceptionally good smearfastness and much better drying times than previously seen:

| Example 1 | | Example 2 | |
|---|---|---|---|
| 5 wt % | glycerol | 5 wt % | glycerol |
| 2 wt % | 1,3-dimethyl-2-imidazolidone | 2 wt % | 1,3-dimethyl-2-imidazolidone |
| 4 wt % | tetramethylene sulfone | | |
| 0.5 wt % | NDAO | 0.5 wt % | NDAO |
| 1.0 wt % | dimethyl-didodecyl ammonium bromide* | 2 wt % | Aerosol OT |
| 4.5 wt % | Cabojet 300 (fully carboxylated) K$^+$ counterion (anionic) | 4 wt % | pyridiniun MMC with phosphate counterion (cationic) |
| balance | water | balance | water |

Notes: NDAO is $C_{12}H_{26}N(CH_3)_2O$ (N,N-dimethyl-N-dodecyl amine oxide)
*Fluka Chemical Co.

The optical densities are acceptable as printed (at least 1.1 OD) and this formulation of the invention provides the necessary waterfastness and smearfastness to give an acceptable product.

Initially, with the fully carboxylated MMC, the applicants found that a precipitate formed upon mixing, which then went into solution with stirring after 5 to 10 minutes. The ink appeared to be extremely waterfast (0 mOD colorant transfer) and smearfast (<100 mOD colorant transfer). It also appeared to dry extremely fast (<10 sec after printing).

A test for smearfastness was performed. The smearfastness test measures the amount of colorant transfer from the printed area with a highlighter. Both fluorescent and non-fluorescent yellow highlighters of Sanford brand were used. The test was performed by passing a highlighter across a plurality of printed bars at a specific time, here, five minutes after printing for example. A two pass refers to passing the highlighter over the same area twice.

The optical density between the bars was measured and compared to that of solid filled blocks. The amount of colorant transfer is expressed in milli-optical density units (mOD). A transfer in the range of 300 to 800 mOD is not considered to be smearfast.

Table I below refers to the results of the smearfast test performed with the ink of Example 1, while Table II below refers to the results of the smearfast test performed with the ink of Example 2.

TABLE I

|  | Fluorescent highlighter smear (mOD) | Non-fluorescent highlighter smear (mOD) |
| --- | --- | --- |
| GBND | 110 | 51 |
| CDCY | 0 | 0 |
| HFDP | 78 | 5 |
| WFCH | 65 | 16 |
| PMCY | 80 | 0 |

TABLE II

|  | Fluorescent highlighter smear (mOD) | Non-fluorescent highlighter smear (mOD) |
| --- | --- | --- |
| GBND | 59 | 24 |
| CDCY | 44 | 8 |
| HFDP | 44 | 27 |
| WFCH | 60 | 27 |
| PMCY | 45 | 18 |

Notes: GBND = Gilbert Bond; CDCY = Champion Datacopy; HFDP = Hammermill Fore DP; WFCH = Weyerhauser First Choice; PMCY = Papyrus Multicopy It is seen from Table I and Table II that both inks (Example 1 and Example 2) evidence a high degree of smearfastness. These inks also evidenced excellent bleed control.

INDUSTRIAL APPLICABILITY

The ink compositions of the invention are expected to find use in thermal ink-jet inks, especially where improved ink characteristics, such as high edge acuity, high optical density, fast drying time, waterfastness, and smearfastness, are desired.

Thus, there has been disclosed a thermal ink-jet ink for thermal ink-jet printing which includes at least one ionic surfactant plus at least one zwitterionic surfactant in conjunction with a macromolecular chromophore. It will be apparent to those skilled in this art that various changes and modifications of an obvious nature may be made; all such changes and modifications are considered to fall within the scope of this invention.

What is claimed is:

1. A thermal ink-jet ink for thermal ink-jet printing comprising:

(a) a vehicle comprising (1) 0 to about 30 wt % of at least one organic solvent, and (2) about 0.1 to 10 wt % of at least one water-soluble ionic surfactant having a first polarity, and (3) about 0.01 to 20 wt % of at least one zwitterionic surfactant;

(b) about 1 to 20 wt % of at least one chemically-modified, water-soluble macromolecular chromophore comprising a pigment having functional groups of a second polarity opposite to said first polarity associated therewith; and (c) the balance water.

2. The ink-jet ink of claim 1, wherein said at least one organic solvent is selected from the group consisting of aliphatic alcohols, aromatic alcohols, diols, glycol ethers, poly(glycol) ethers, caprolactams, formamides, acetamides, and long chain alcohols.

3. The ink-jet ink of claim 2, wherein said at least one organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,$\omega$-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

4. The ink-jet ink of claim 3 wherein said at least one organic solvent is selected from the group consisting of N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

5. The ink-jet ink of claim 1, wherein said at least one solvent is present within a range of about 3 to 15 wt %.

6. The ink-jet ink of claim 1, wherein said macromolecular chromophore is anionic and said at least one ionic water-soluble surfactant is cationic and is selected from the group consisting of

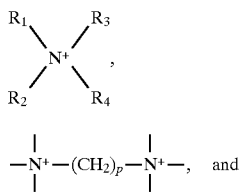

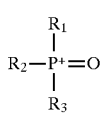

where $R_1$, $R_2$, $R_3$, and $R_4$ are alkyls represented by the formulae $R_1 = -(CH_2)_n CH_3$ $R_2 = -(CH_2)_m CH_3$ $R_3 = -(CH_2)_l CH_3$ $R_4 = -(CH_2)_k CH_3$, where k, l, m, and n are integers independently within the range of 0 to 25, and where p is in the range of 6 to 25.

7. The ink-jet ink of claim 6, wherein said cationic surfactant has counterions associated therewith, said counterions being selected from the group consisting of halide, sulfate, nitrate, phosphate, sulfonate, tetrafluororborate, methanesulfonate, phosphite, phosphonate, methyl benzenesulfonate, hexafluorophosphonate, hexafluorophosphate, phosphene, phenolate, tungstate, molybdate, and silicate ions.

8. The ink-jet ink of claim 1, wherein said macromolecular chromophore is cationic and said at least one ionic water-soluble surfactant is anionic and is selected from the group consisting of

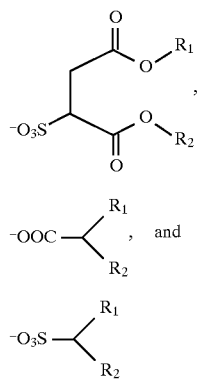

where $R_1$ and $R_2$ are alkyls represented by the formulae $R_1 = -(CH_2)_n CH_3$ $R_2 = -(CH_2)_m CH_3$ where m and n are integers independently within the range of 10 to 25.

9. The ink-jet ink of claim 8, wherein said anionic surfactant has counterions associated therewith, said counterions being selected from the group consisting of ammonium ions.

10. The ink-jet ink of claim 9, wherein said counterions are selected from the group consisting of dimethylammonium, trimethylammonium, dipropylammonium, and tetramethylammonium ions.

11. The ink-jet ink of claim 1, wherein said at least one ionic surfactant is present within a range of about 0.2 to 5 wt %.

12. The ink-jet ink of claim 1, wherein said zwitterionic surfactant consists essentially of at least one member selected from the group consisting of (a) an amine oxide selected from the group consisting of $R-N^+(CH_3)_2O^-$, where R is either a saturated or an unsaturated alkyl group having a chain length between 8 and 25 carbon atoms and (b) a betaine, which has the formula

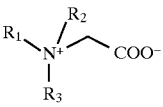

where $R_1$, $R_2$, and $R_3$ are each in the range of 10 to 23 carbon atoms and where $R_1$, $R_2$, and $R_3$ are selected from the group consisting of alkyls, alkenyls, alkynes, aryls, and arenes.

13. The ink-jet ink of claim 12 wherein said amine oxide is selected from the group consisting of N,N-dimethyl-N-(Z-9-octadecenyl)-N-amine oxide, N,N-dimethyl-N-dodecyl amine oxide, isostearamidopropylamine oxide; isostearamidopropyl morpholine oxide; lauramine oxide; myristamine oxide; cetamine oxide; minkamidopropylamine oxide; oleamidopropylamine oxide; oleyl dimethylamine oxide; olivamidopropylamine oxide; stearamine oxide; sesamidopropylamine oxide; and wheat germamidopropylamine oxide.

14. The ink-jet ink of claim 1, wherein said at least one zwitterionic surfactant is present within a range of about 0.2 to 1 wt %.

15. The ink-jet ink of claim 1, wherein said pigment is selected from the group consisting of black, cyan, yellow, and magenta pigments.

16. The ink-jet ink of claim 1, wherein said pigment is present within a range of about 0.5 to 10 wt %.

17. A method of ink-jet printing comprising printing on a medium with an ink-jet ink having the following composition:

(a) a vehicle comprising (1) 0 to about 30 wt % of at least one organic solvent, and (2) about 0.1 to 10 wt % of at least one water-soluble ionic surfactant having a first polarity, and (3) about 0.01 to 20 wt % of at least one zwitterionic surfactant;

(b) about 1 to 20 wt % of at least one chemically-modified, water-soluble macromolecular chromophore comprising a pigment having functional groups having a second polarity opposite to said first polarity associated therewith; and (c) the balance water.

18. A method for increasing waterfastness in an ink-jet ink comprising:

(a) providing at least one macromolecular chromophore comprising a pigment having functional groups having a first polarity associated therewith; and (b) combining about 1 to 20 wt % of said pigment with (1) a vehicle comprising (i) 0 to about 30 wt % of at least one organic solvent, and (ii) about 0.1 to 10 wt % of at least one water-soluble ionic surfactant having a polarity opposite to that of said macromolecular chromophore, and (iii) about 0.01 to 20 wt % of at least one zwitterionic surfactant and (2) the balance water to form said ink.

* * * * *